(12) United States Patent
DeRobbio et al.

(10) Patent No.: US 12,276,419 B1
(45) Date of Patent: Apr. 15, 2025

(54) SYSTEM AND METHOD FOR LANDFILL FLARE ANTI- VIBRATION

(71) Applicant: WM INTELLECTUAL PROPERTY HOLDINGS, L.L.C., Houston, TX (US)

(72) Inventors: Adam C. DeRobbio, Greentown, PA (US); Dennis Craig Siegel, Mount Pleasant, PA (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/607,353

(22) Filed: Mar. 15, 2024

Related U.S. Application Data

(60) Provisional application No. 63/452,516, filed on Mar. 16, 2023.

(51) Int. Cl.
*F23G 7/08* (2006.01)
*G05B 19/048* (2006.01)

(52) U.S. Cl.
CPC .............. *F23G 7/08* (2013.01); *G05B 19/048* (2013.01); *G05B 2219/41108* (2013.01)

(58) Field of Classification Search
CPC ................... F23G 7/08; G05B 19/048; G05B 2219/41108
See application file for complete search history.

(56) References Cited

U.S. PATENT DOCUMENTS

| | | | |
|---|---|---|---|
| 5,445,517 A | 8/1995 | Kondou et al. | |
| 10,850,314 B2 | 12/2020 | Chambers | |
| 11,486,573 B1 | 11/2022 | Siegel | |
| 2005/0074712 A1 | 4/2005 | Brookshire et al. | |
| 2014/0170576 A1* | 6/2014 | Colannino | F23G 7/063 431/264 |

FOREIGN PATENT DOCUMENTS

| | | |
|---|---|---|
| CN | 209295151 U | 8/2019 |
| IT | 202000029960 A1 | 6/2022 |

OTHER PUBLICATIONS

Nathan, G.J. et al.; Investigation of a combustion driven oscillation in a refinery flare. Part A: Full scale assessment; Elsevier; pp. 285-295; Mar. 2006.

* cited by examiner

*Primary Examiner* — Alfred Basichas
(74) *Attorney, Agent, or Firm* — Greenberg Traurig LLP

(57) ABSTRACT

An automated system to monitor, record, and stop landfill harmonic vibrations before they become detectable to the local community is provided. Key components of the system are measured and monitored for vibration intensity and duration. When any of these measurements exceeds critical set point values, the landfill gas blower speed is reduced or the system is shutdown.

5 Claims, 4 Drawing Sheets

300 FT Radius of Influence (ROI) Around Flare Stack

○ - Potential Mounting Locations for Vibration Transmitters

SYSTEM AND METHOD FOR LANDFILL FLARE ANTI- VIBRATION

RELATED APPLICATIONS

This application claims the benefit, and priority benefit, of U.S. Provisional Patent Application Ser. No. 63/452,516, filed Mar. 16, 2023, the disclosure and contents of which are incorporated by reference herein in their entirety.

BACKGROUND

Field of the Invention

The presently disclosed subject matter relates to a landfill flare anti-vibration system.

Description of the Related Art

It is known in the art that landfill gas-enclosed flares can develop a harmonic vibration or reverberate. The reverberations can be experienced by residents in the vicinity of the landfill, which can impact community relationships. Some of the stronger vibrations can be long in duration, resulting in more residents reporting experiencing the phenomena. In most events, reports of windows and doors shaking, along with an audible noise emanating from the landfill, is a common impact on the local community.

It is believed that no one set of contributing factors causes the phenomena; however, there are certain known processes that can lead to vibrations. For example, excessive flow rates can cause pulsations that combust the gas directly off the burner. In some instances, this pulsing can lead to vibration energy waves that sometimes result in a harmonic resonance and vibrating of the combustion air dampers. The shaking of the dampers amplifies this energy wave and increases reverberations that can be heard and felt/observed over long distances.

Improvements in this field of technology are desired.

SUMMARY

The following presents a simplified summary of the disclosed subject matter in order to provide a basic understanding of some aspects thereof. This summary is not an exhaustive overview of the technology disclosed herein.

Various illustrative embodiments of a landfill flare anti-vibration system are provided herein. In certain illustrative embodiments, the landfill flare anti-vibration system can include a first vibration transmitter installed on the landfill flare, a second vibration transmitter installed on a mounting location at or near the landfill and configured to measure vibrations from the landfill flare, wherein the mounting location is within a radius of influence of the landfill flare, and a programmable logic controller operatively connected to the first vibration transmitter and the second vibration transmitter, wherein the programmable logic controller is configured to receive signals from the first vibration transmitter and the second vibration transmitter relating to vibrations from the landfill flare and, if the vibrations from the landfill flare exceed an alarm setpoint value, send a command to a control panel for the landfill flare to instruct one or more blowers operatively associated with the landfill flare to lower the flow of landfill gas to the landfill flare. The mounting location can be at least one of a building and a freestanding structure within a radius of influence of the landfill flare.

In certain illustrative embodiments, the landfill flare anti-vibration system can include a vibration transmitter installed on a mounting location at or near the landfill and configured to measure vibrations from the landfill flare, wherein the mounting location is within a radius of influence of the landfill flare, and a programmable logic controller operatively connected to the vibration transmitter, wherein the programmable logic controller is configured to receive signals from the vibration transmitter relating to vibrations from the landfill flare and, if the vibrations from the landfill flare exceed an alarm setpoint value, send a command to a control panel for the landfill flare to instruct one or more blowers operatively associated with the landfill flare to lower the flow of landfill gas to the landfill flare. The mounting location can be at least one of a building and a freestanding structure within a radius of influence of the landfill flare.

In certain illustrative embodiments, a method of reducing vibrations from a landfill flare at a landfill is provided. Vibrations emitting from the landfill flare can be measured, wherein the vibrations are measured at a location that is within a radius of influence of the landfill flare but is not at the landfill flare. The m location can be, for example, at least one of a building and a freestanding structure within a radius of influence of the landfill flare. If the vibrations from the landfill flare exceed an alarm setpoint value, instructions can be sent to one or more blowers operatively associated with the landfill flare to lower the flow of landfill gas to the landfill flare.

BRIEF DESCRIPTION OF THE DRAWINGS

A better understanding of the presently disclosed subject matter can be obtained when the following detailed description is considered in conjunction with the drawings and figures herein, wherein.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a system and method for landfill flare anti-vibration are provided herein.

As generally shown in FIG. 1-FIG. 4 herein, an automated system and method are disclosed to monitor, record, and stop landfill harmonic vibrations before they become detectable to the local community. Key components of the system are measured and monitored for vibration intensity and duration. When any of these measurements exceeds critical set point values, the landfill biogas blower speed is reduced or the system is shutdown.

Landfill biogas, also known as landfill gas (LFG), is a type of biogas that is generated from the decomposition of organic waste in landfills. When organic materials such as food waste, yard waste, and other biodegradable waste are deposited in landfills, they undergo a natural degradation process known as anaerobic decomposition. The primary component of landfill biogas is methane ($CH_4$), which is a potent and a valuable source of energy. In addition to methane, landfill biogas also contains carbon dioxide ($CO_2$), small amounts of other gases, and trace impurities such as hydrogen sulfide ($H_2S$).

One likely root cause of the vibrations is high gas flow and higher levels of oxygen in the gas (oxygen serves as an accelerant resulting in increased combustion temperatures). Preventing the vibrations from occurring can be approached by controlling/reducing the oxygen content or by controlling the airflow.

Figure 1:
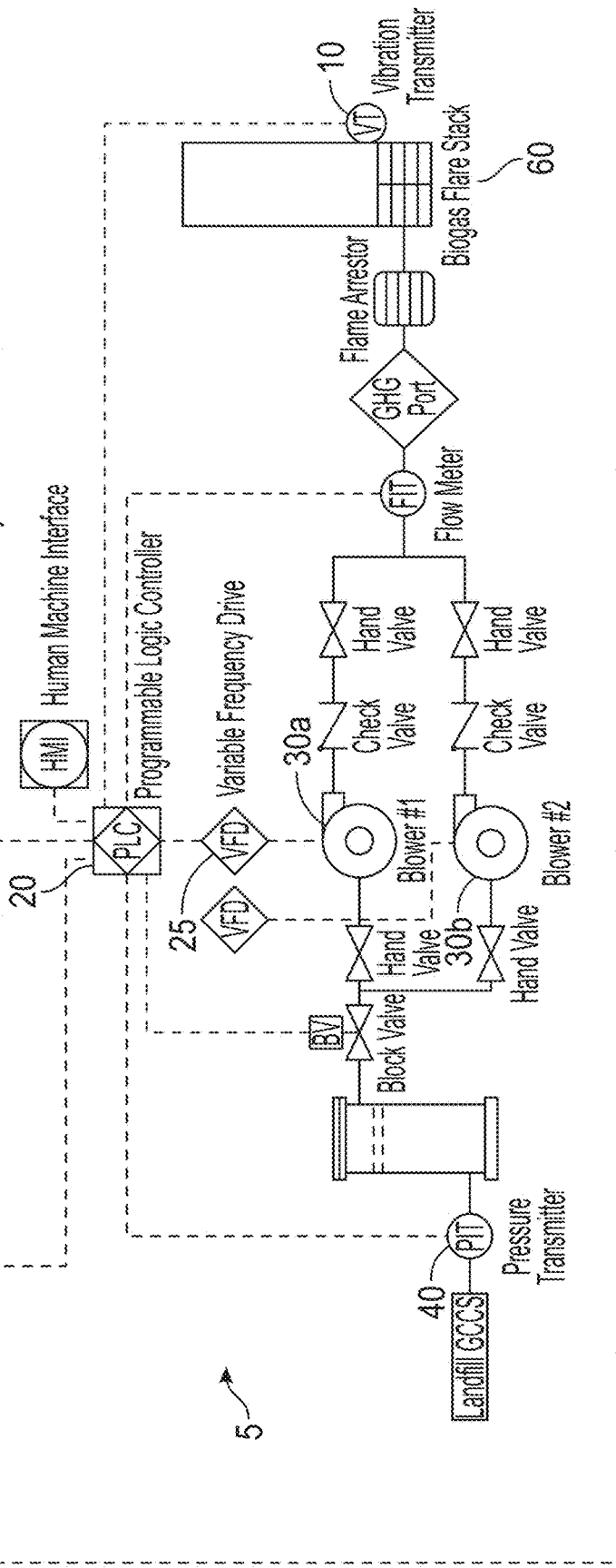
FIG. 1 is an overview of a system and method for landfill flare anti-vibration according to embodiments of the presently disclosed subject matter.

In certain illustrative embodiments, the system 5 can include one or more industrial vibration transmitters installed on each flare 60 or in the flare area at the landfill. For example, as shown in FIG. 1, vibration transmitter 10 can be installed on the flare 60, and vibrations transmitters 15a, 15b can be installed on various mounting locations in the flare area. These transmitter 10, 15a, 15b are connected to a PLC (Programmable Logic Controller 20), and the controller 20 can measure the flare vibrations in, for example, Inches Per Second. The controller 20 can be programmed to send a command to each control panel for flare 60 if the flare vibration exceeds the alarm setpoint value (ex: 0.06 I.P.S.) for longer than some designated time period, such as three (ex: 1.5) seconds. A baseline vibration and high vibration set point will be determined during commissioning.

Once the control panel for the flare 60 receives this command, the landfill vacuum setpoint can automatically adjust to a new predetermined vacuum control setpoint. For example, −60 inwc Primary Wellfield Control Setpoint (No vibrations), and/or −40 inwc Secondary Wellfield Control Setpoint (Vibrations detected).

Once this command is active, the landfill biogas blower variable frequency drives 25 (VFD) can slow down the landfill biogas blowers 30a, 30b to the "Secondary Wellfield Control Setpoint" which in-turn lowers the flow of landfill gas to the flare 60. This reduction of landfill gas flow immediately stops the reverberations of flare 60. The control system then latches to the "Secondary Wellfield Control Setpoint" and places an alarm phone call to the site employees at the landfill notifying them of the past vibration alarm and that the landfill biogas blowers 30a, 30b are now using the secondary wellfield control setpoint.

The employees at the landfill site will then take corrective action. Once the site employees have located the cause of the reverberations, they will depress a reset button on the anti-vibration control panel. This will return the landfill biogas blowers 30a, 30b to the primary wellfield control setpoint if the vibration is no longer in alarm.

In certain illustrative embodiments, there is an option for an automatic primary vacuum return mode within the system 5. If this mode is active and the vibration is less than the high vibration setpoint for more than a set time period (ex: 30 mins), the landfill biogas blower vacuum setpoint returns to the primary control. This function is disabled after three high level alarms within an hour. Once disabled, the reset alarm button must be depressed to reset the automatic primary return mode.

In certain illustrative embodiments, the system 5 has a function that completely shuts down the flare 60 if the reverberations continue, regardless of mode, when the vibration is at a high-high vibration setpoint. Operators can also configure the system 5 only to shut down if the vibration exceeds the high-high level setpoint, thus not using the step-down process.

In certain illustrative embodiments, system 5 can include a local data acquisition recorder that will data log both vibration transmitters for record keeping and all high-level vibration alarms will be time stamped. Alarm email/text notification and remote access to the vibration control system can be available to the site operations team from mobile devices (tablets and smartphones) providing real-time access 24/7.

FIG. 1 is an overview of a system 5 for landfill flare anti-vibration according to embodiments of the presently disclosed subject matter.

Figure 2:
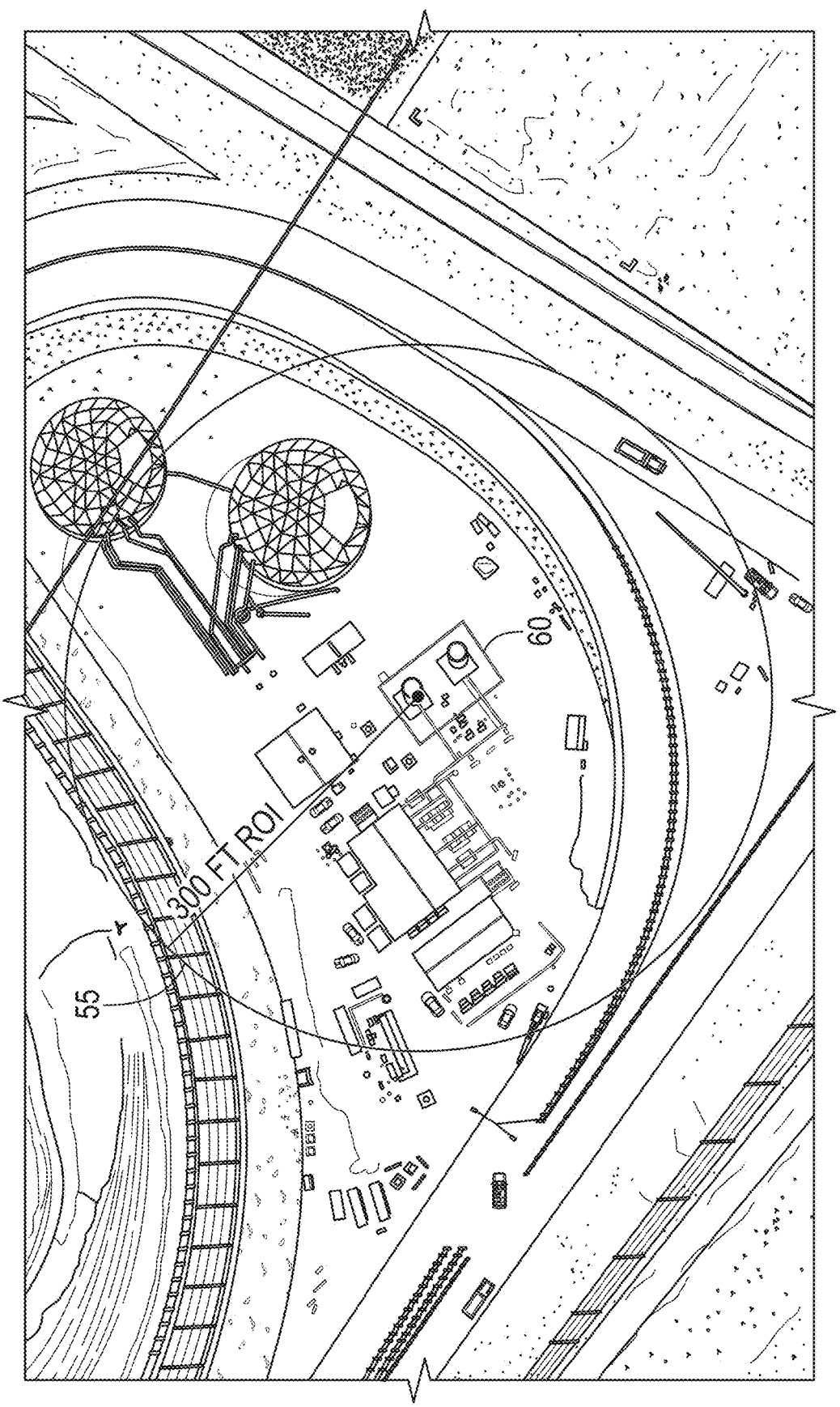
FIG. 2 is a top view of a radius of influence around a flare stack for a system and method for landfill flare anti-vibration according to embodiments of the presently disclosed subject matter.

FIG. 2 is a top view of a radius of influence 55 around a flare stack for a system 5 for landfill flare anti-vibration according to embodiments of the presently disclosed subject matter.

The radius of inceluence 55 does not necessarily need to be a "radius", i.e., circular in shape, but can be any defined region of any shape within which flare vibrations can be felt and measured.

Figure 3:
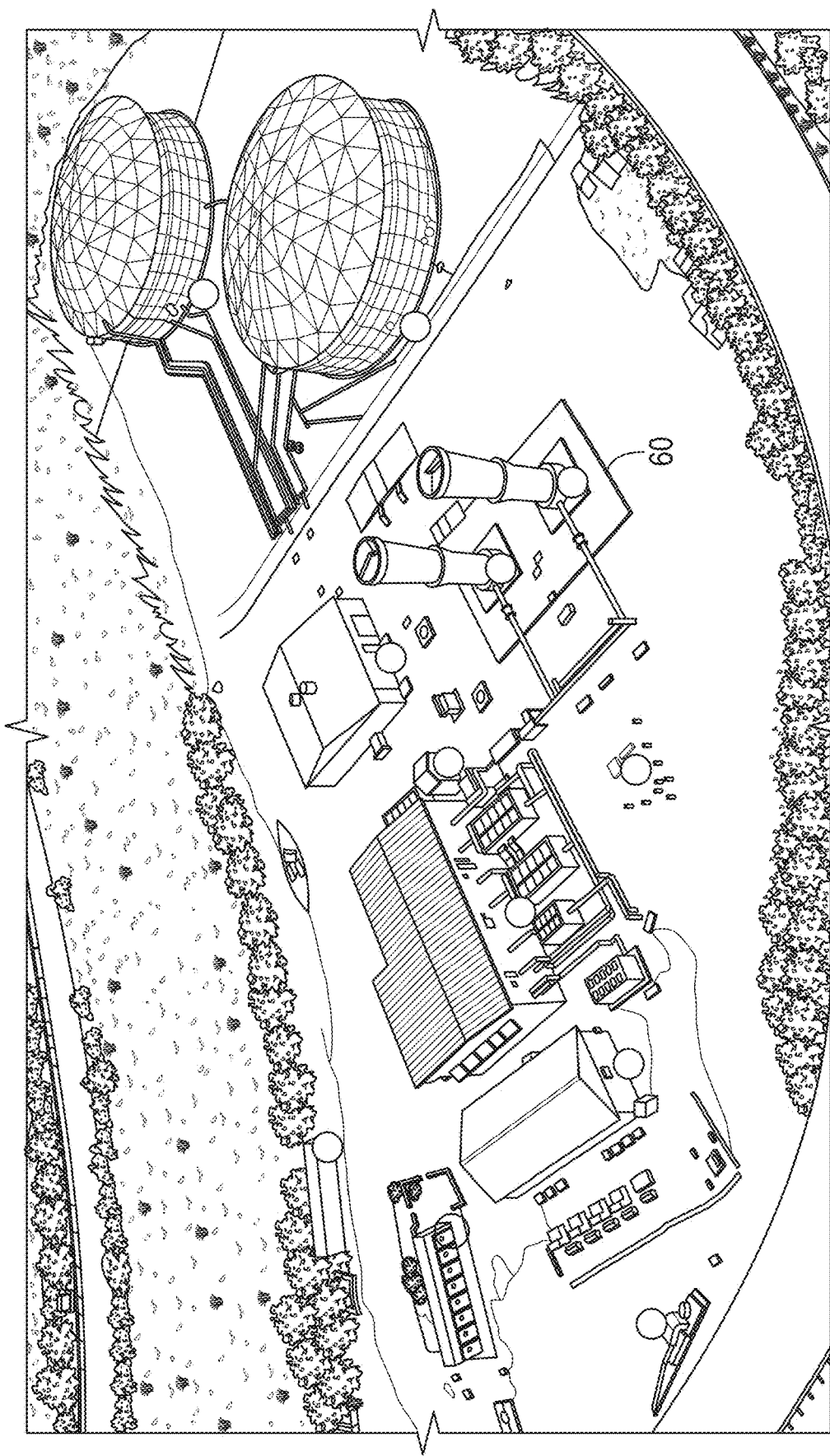
FIG. 3 is a side perspective view of potential mounting locations for vibration transmitters for a system and method for landfill flare anti-vibration according to embodiments of the presently disclosed subject matter.

FIG. 3 is a side perspective view of various potential mounting locations 50 for vibration transmitters 10, 15 on the landfill site for a system 5 for landfill flare anti-vibration according to embodiments of the presently disclosed subject matter.

Figure 4:
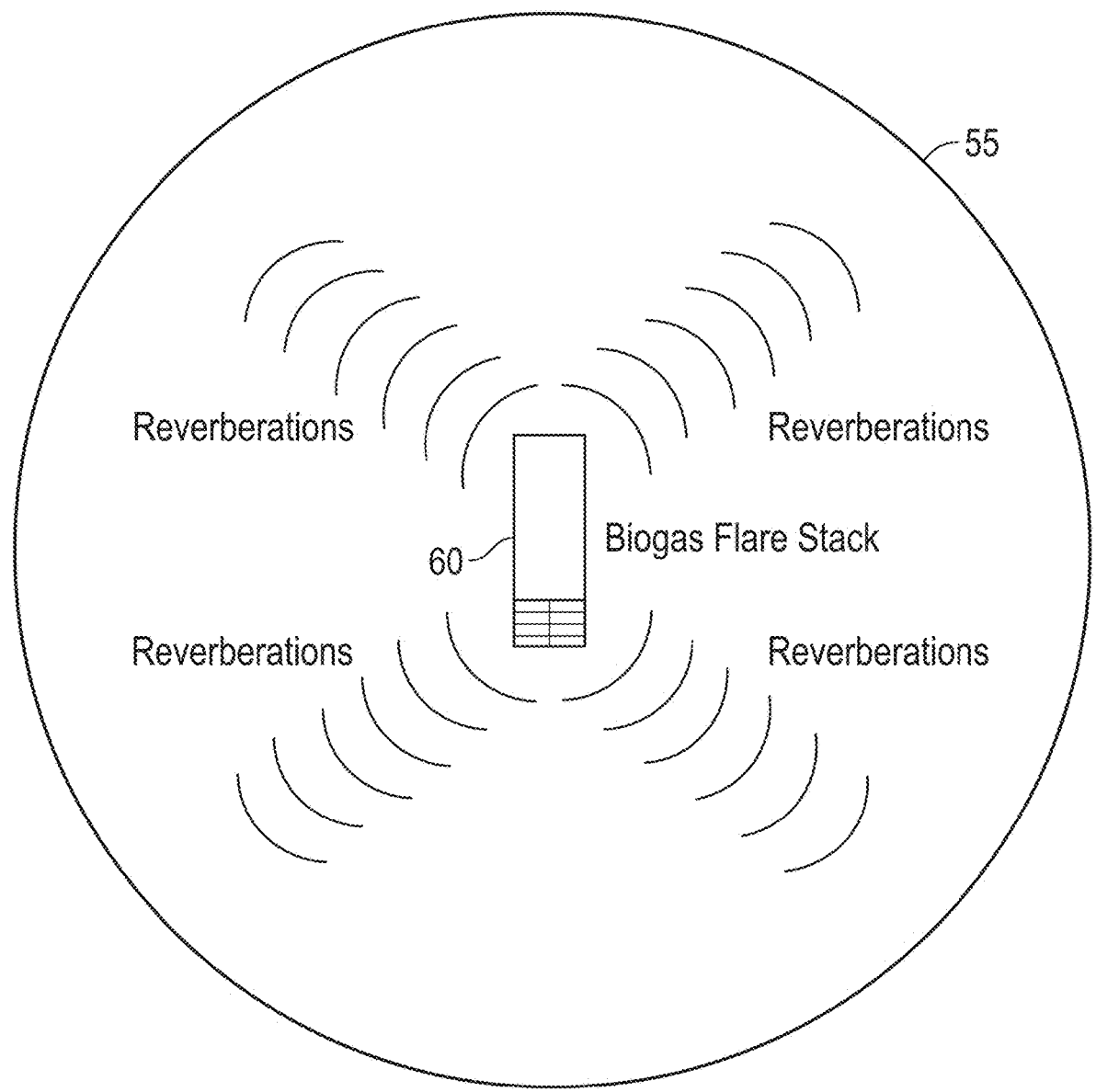
FIG. 4 is a example of flare reverberations within a 300 foot radius of influence for a system and method for landfill flare anti-vibration according to embodiments of the presently disclosed subject matter.

FIG. 4 is a example of flare reverberations within a 300 foot radius of influence 55 for a system 5 for landfill flare anti-vibration according to embodiments of the presently disclosed subject matter.

User Inputs: In certain illustrative embodiments, the following user-selectable inputs should be allowed by the HMI. All setpoints should be password protected.

| HMI Inputs |
| --- |
| VT = Vibration Transducer |
| VT-High SP: 0.01 to 0.10 in/s |
| VT-High High SP: 0.01 to 0.10 in/s |
| VT-High Time Delay: 0-3 sec. |
| VT-High High Time Delay: 0-5 sec. |
| VT-High Shutdown Time Delay: 0-5 sec. |
| Primary Vacuum Setpoint: 0-99.9 "WC |
| Secondary Vacuum Setpoint: 0-99.9 "WC (if used) |
| Return to Primary Vacuum TD: 30-60 minutes (if used) |
| Vibration Counter Input: 0-3 ( |
| Vibration Counter Rest Button: Momentary Touch |
| Disable the Secondary/HighLevel SP |
| Control selection button |

| |
| --- |
| Alarm & Call Out-Will have Edge & Modem (Alert call outs) |
| Vibration Transducer High |
| Vibration Transducer High High |
| Vibration Counter Lock Out (if used) |

In certain illustrative embodiments, Vibration Transducers can be trended and logged (1 sec to 30 sec), vibration Transducer PV tags can be pushed to OTM, and/or the HMI can trend Vibration Transducers In certain illustrative embodiments, the Sequence of Operations (SOO) can be as follows:

---

Sequence of Operations (SOO)

---

1. Flare 60 operates under primary vacuum control unless:
   a. Vibration Transducer PV exceeds Vibration Transducer High SetPoint for > "X" seconds
       i. Flare 60 switches to secondary vacuum control
       ii. Alarm with time stamp
       iii. Call out
       iv. VT-High Shutdown Time Delay is used to provide time for the flare to stop vibrating and prevent the flare from vibrating during the secondary vacuum control
       v. VT counter one shot
   b. Vibration Transducer PV exceeds Vibration Transducer High-High SetPoint > "X" seconds
       i. Alarm with time stamp
       ii. Shutdown (no auto-restart)
       iii. Call out
2. Flare 60 returns to primary vacuum control if: (if used)
   c. Vibration Transducer PV is under Vibration Transducer High SetPoint for >= "X" minutes consecutively, and Vibration Transducer counter is <= "X" SP
3. Flare 60 does not return to primary vacuum control if:
   a. Vibration Transducer PV is not under Vibration Transducer High SetPoint for > "X" minutes consecutively OR Vibration Transducer counter is > "X" SP
4. Shutdown
   a. High Vibration Shutdown Delay
   b. High-High Vibration
5. VT Counter Reset-(If used)
   a. Manual reset by operator OR reset after primary vacuum control for > consecutive 24 hours

---

Various illustrative embodiments of a landfill flare anti-vibration system 5 are provided herein. In certain illustrative embodiments, the landfill flare anti-vibration system 5 can include a first vibration transmitter 10 installed on the landfill flare 60, a second vibration transmitter 15 installed on a mounting location 50 at or near the landfill and configured to measure vibrations from the landfill flare 60, wherein the mounting location 50 is within a radius of influence 55 of the landfill flare 60, and a programmable logic controller 20 operatively connected to the first vibration transmitter 10 and the second vibration transmitter 15, wherein the programmable logic controller 20 is configured to receive signals from the first vibration transmitter 10 and the second vibration transmitter 15 relating to vibrations from the landfill flare 60 and, if the vibrations from the landfill flare 60 exceed an alarm setpoint value, send a command to a control panel for the landfill flare 60 to instruct one or more blowers 30 operatively associated with the landfill flare 60 to lower the flow of landfill gas to the landfill flare 60. The mounting location 50 can be at least one of a building and a freestanding structure within the radius of influence 55 of the landfill flare 60.

In certain illustrative embodiments, the landfill flare anti-vibration system 5 can include a vibration transmitter 15 installed on a mounting location 50 at or near the landfill and configured to measure vibrations from the landfill flare 60, wherein the mounting location 50 is within a radius of influence 55 of the landfill flare 60, and a programmable logic controller 20 is operatively connected to the vibration transmitter 15, wherein the programmable logic controller 20 is configured to receive signals from the vibration transmitter 15 relating to vibrations from the landfill flare 60 and, if the vibrations from the landfill flare 60 exceed an alarm setpoint value, send a command to a control panel for the landfill flare 60 to instruct one or more blowers 30 operatively associated with the landfill flare 60 to lower the flow of landfill gas to the landfill flare 60. The mounting location 50 can be at least one of a building and a freestanding structure within the radius of influence 55 of the landfill flare 60.

In certain illustrative embodiments, a method of reducing vibrations from a landfill flare 60 at a landfill is provided. Vibrations emitting from the landfill flare 60 can be measured, wherein the vibrations are measured at a location that is within a radius of influence 55 of the landfill flare 60 but is not at the landfill flare 60. In other words, the measurements are taken from a transmitter at a location that is not on the flare 60 itself (such as a mounting location 50 on a building or freestanding structure). The mounting location 50 can be, for example, at least one of a building and a freestanding structure within the radius of influence 55 of the landfill flare 60. If the vibrations from the landfill flare 60 exceed an alarm setpoint value, instructions can be sent to one or more blowers 30 operatively associated with the landfill flare 60 to lower the flow of landfill gas to the landfill flare 60.

Those skilled in the art will appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

It is to be understood that the presently disclosed subject matter is not limited to the embodiment(s) described above and illustrated herein, but encompasses any and all variations falling within the scope of the appended claims.

What is claimed is:

1. A landfill flare anti-vibration system comprising:
    a first vibration transmitter installed on the landfill flare;
    a second vibration transmitter installed on a mounting location at or near the landfill and configured to measure vibrations from the landfill flare, wherein the mounting location is within a radius of influence of the landfill flare;
    a programmable logic controller operatively connected to the first vibration transmitter and the second vibration transmitter, wherein the programmable logic controller is configured to receive signals from the first vibration transmitter and the second vibration transmitter relating to vibrations from the landfill flare and, if the vibrations from the landfill flare exceed an alarm setpoint value, send a command to instruct one or more blowers operatively associated with the landfill flare to lower the flow of landfill gas to the landfill flare.

2. The system of claim 1, wherein the mounting location comprises at least one of a building and a freestanding structure.

3. A landfill flare anti-vibration system comprising:
    a vibration transmitter installed on a mounting location at or near the landfill and configured to measure vibrations from the landfill flare, wherein the mounting location is within a radius of influence of the landfill flare;
    a programmable logic controller operatively connected to the vibration transmitter, wherein the programmable logic controller is configured to receive signals from the vibration transmitter relating to vibrations from the landfill flare and, if the vibrations from the landfill flare exceed an alarm setpoint value, send a command to a control panel for the landfill flare to instruct one or more blowers operatively associated with the landfill flare to lower the flow of landfill gas to the landfill flare.

4. The system of claim 3, wherein the mounting location comprises at least one of a building and a freestanding structure.

5. A method of reducing vibrations from a landfill flare at a landfill comprising:
    measuring vibrations emitting from the landfill flare, wherein the vibrations are measures at a location that is within a radius of influence of the landfill flare but is not at the landfill flare;
    determining if the vibrations from the landfill flare exceed an alarm setpoint value;
    if the vibrations from the landfill flare exceed an alarm setpoint value, sending instructions to one or more blowers operatively associated with the landfill flare to lower the flow of landfill gas to the landfill flare.

* * * * *